Figure 1:
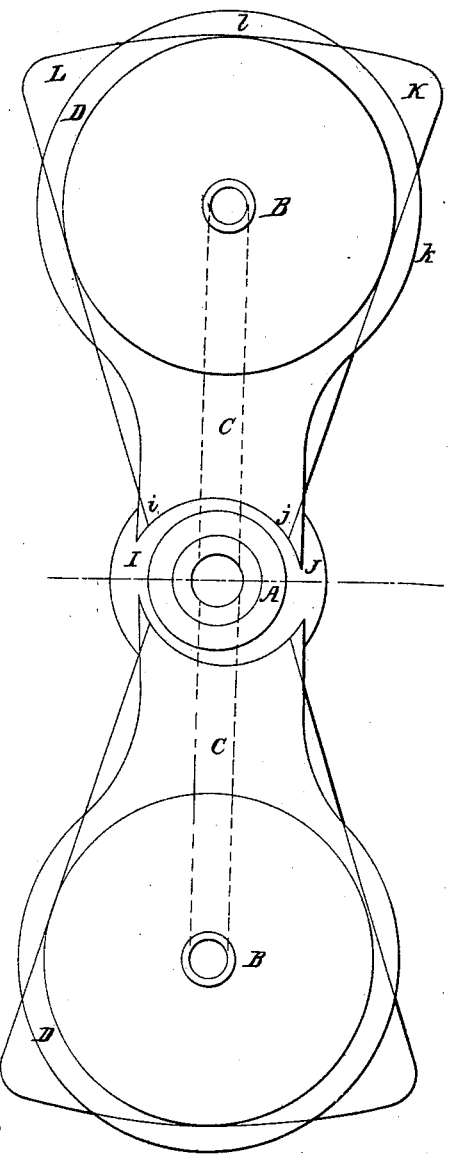

O. BYRNE & J. G. ELLIOTT.
SCREW PROPELLER.

No. 21,650.

4 Sheets—Sheet 2.

Patented Oct. 5, 1858.

Witnesses.

Inventors.

4 Sheets—Sheet 3.
O. BYRNE & J. G. ELLIOTT.
SCREW PROPELLER.
No. 21,650. Patented Oct. 5, 1858.
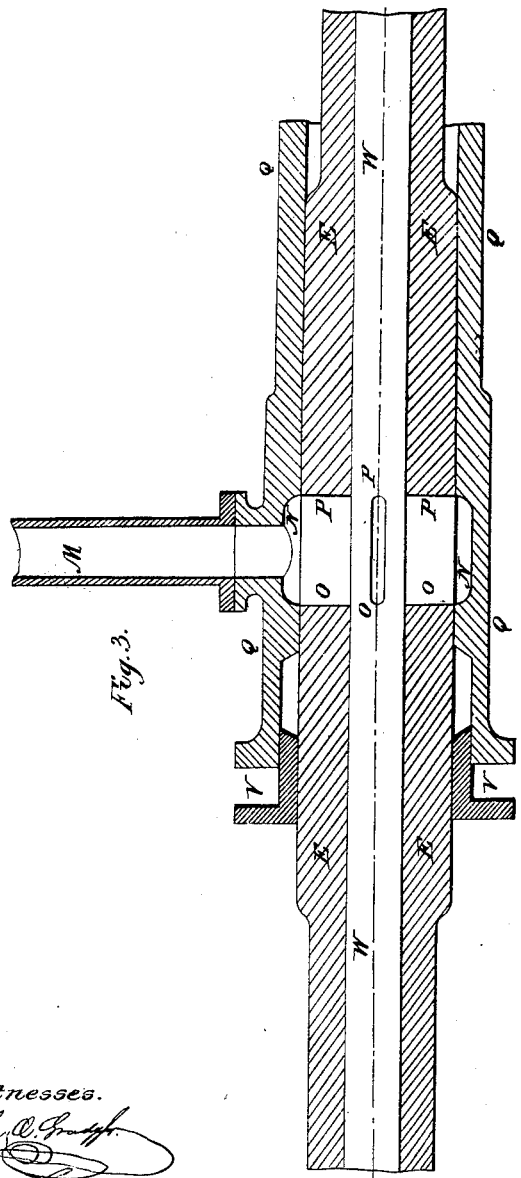
Witnesses.
Inventors.

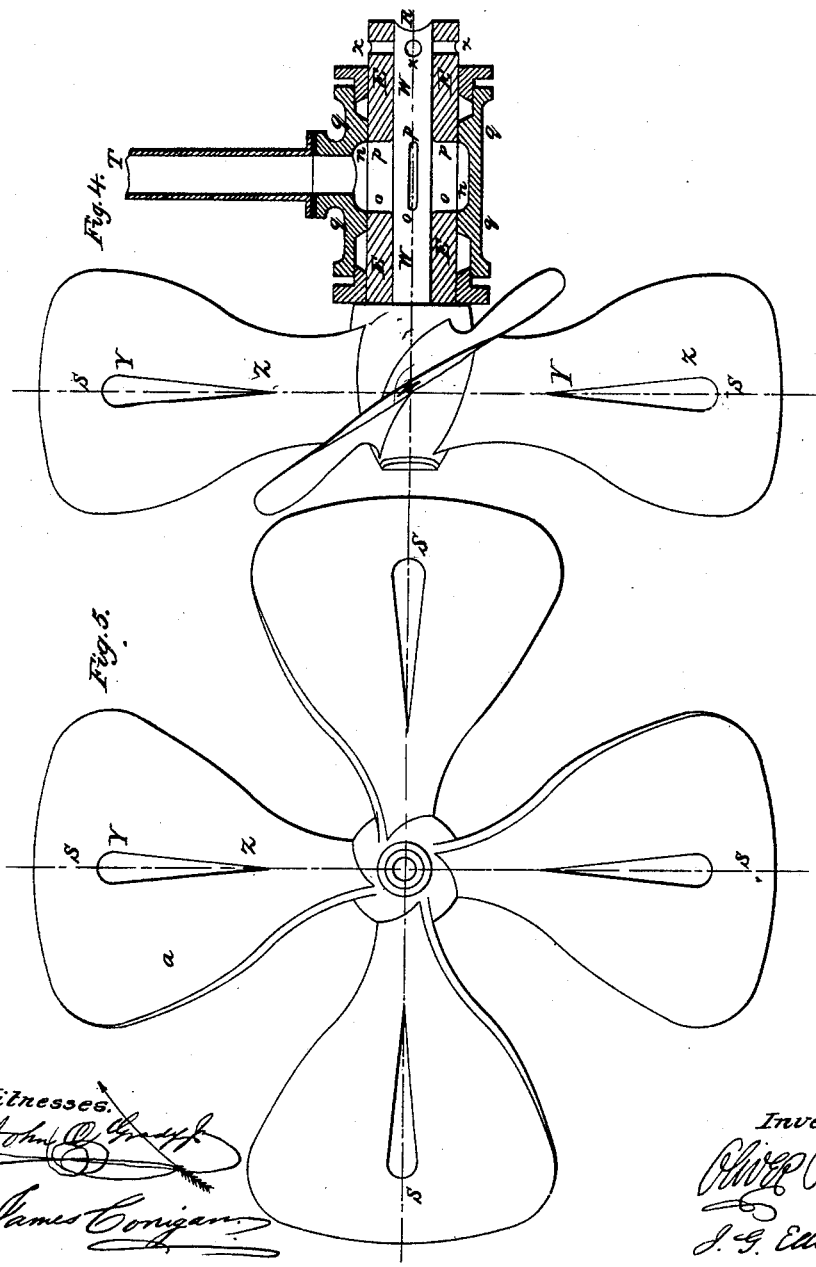

UNITED STATES PATENT OFFICE.

OLIVER BYRNE AND J. G. ELLIOTT, OF NEW YORK, N. Y.

SCREW-PROPELLER.

Specification of Letters Patent No. 21,650, dated October 5, 1858.

*To all whom it may concern:*

Be it known that we, OLIVER BYRNE and J. G. ELLIOTT, of the city of New York, in the county and State of New York, have invented a new and Improved Method of Constructing Screw-Propellers to Propel Ships and Vessels; and we do hereby declare that the following is a full and exact description thereof, reference being had to the accompanying drawings and to the letters of reference marked thereon.

The nature of our invention consists in forming screw-propellers so that a sufficient quantity of water may be passed through a hollow shaft, or through a pipe, to the rear of the blades, not for the purpose of giving a rotary motion to the screw, but for the purpose of filling up the hollow space, or vacuum, established behind the blades by the motion of the vessel through the water; thus giving a firmer purchase to the screw, and avoiding in a great measure, what is termed slip. After being used, the cooling, condensing, or any other water that has to be discharged from the ship, it may be allowed to pass through the shaft, if hollow, or through a tube to the rear of the acting area of the propeller; or the water required, to effect our object, may be taken direct through the vessel from outside; from the forward part is best, as the water is piled up in front when the ship is in motion.

To enable others skilled in the art to make and use our invention, we will proceed to describe its construction and operation.

Our propeller may be constructed of any of the known forms and operated by any of the known methods of gearing, but the form that we prefer, and found by experiment to be the best, is that which has the center of effort in the center of the acting area of each blade; and when the water is discharged through the backs of the blades, the openings should be opposite, or symmetrically arranged with regard to these centers. We have determined that the power necessary to turn a solid metal screw and shaft, doing a given work, at a given velocity, needs not be increased when a hollow shaft and screw, through which water flows, are employed to do the same work, under the same circumstances, and in the manner herein described. Openings of different forms may be made in the blades, provided the action of the water passing through them has no tendency to give a rotary motion to the screw. A valve may be placed in any convenient place in the hollow shaft, or pipe, that conducts the water aft the propeller to prevent its return in cases of back action.

We hereby declare that the following, is a full, clear, and exact description of the construction and operation of screw propellers involving the application of our invention.

Figure 1, is an end view of a two blade screw propeller; B, B, are openings at the rear of the blades, opposite the centers of effort in the acting areas; B, B, communicate through passages C, C, with the hollow shaft A; I J K L represents the common screw blade; *i j k l* the form recommended by us; the projected area I J K L on a plane perpendicular to the axis of the shaft A, is equal to the projected area *i j k l* on the same plane.

Figure 2:
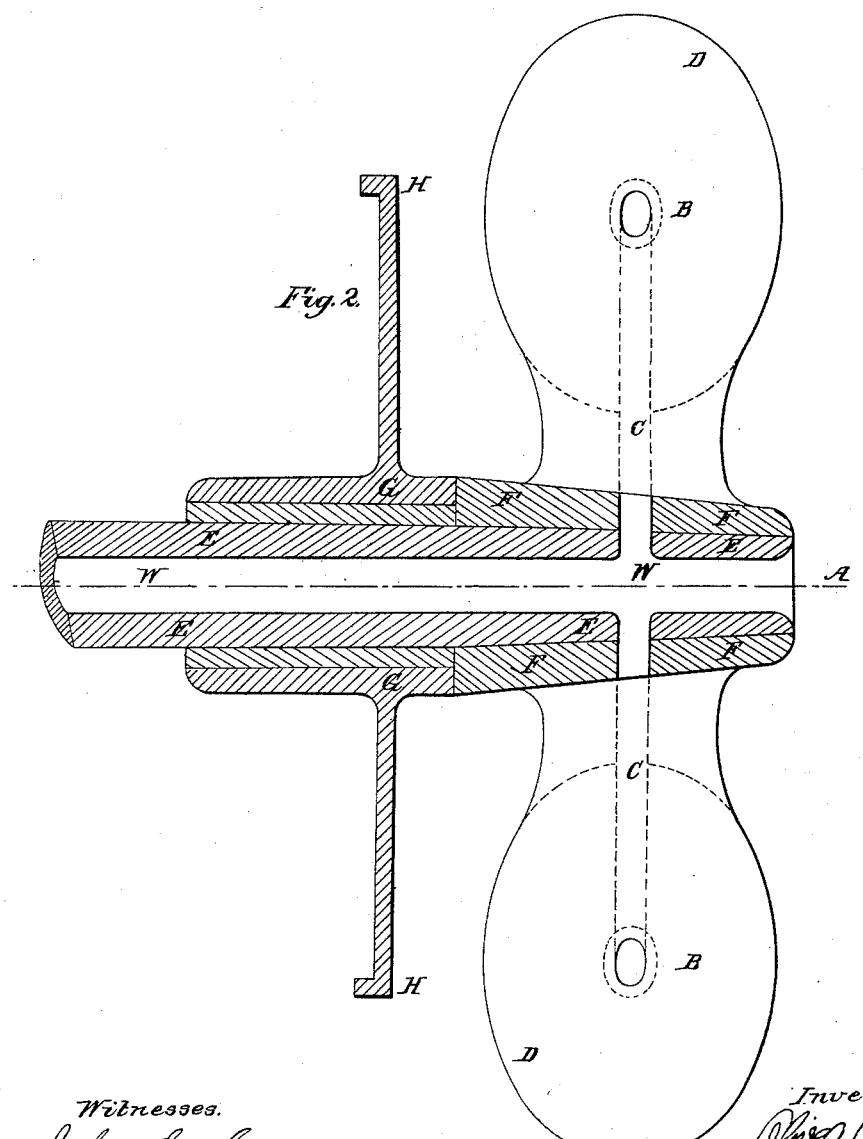

Fig. 2, is a longitudinal section of Fig. 1; the propeller D F F D is permanently keyed on the shaft E E E E, but may be retained by a clutch. W, W, is the hollow in the shaft through which the water is allowed to flow; C, C, are passages for the water from the hollow shaft to the blades D, D; the water passing through C, C, is discharged at B, B; the passages C, C, may be curved when necessary; G, G; H, H, represents the stuffing box and its holdfasts.

Fig. 3, is a longitudinal section, and represents one of the many plans by which the water may be made to enter a hollow shaft E E E E; a copper pipe M, is connected by flanges to the casing Q, Q; the water passes through M into W, W, through openings OP, OP, OP, cut in E, E, and secured by stuffing boxes V, V,; where Q, Q, is applied, the diameter of the shaft E, E, is increased to render it sufficiently strong where the openings OP, OP, are made. N, N is a hollow space, made in the casing Q, Q, communicating with the pipe M, and with the openings OP, OP, that revolve with the shaft E, E and admit the water to W, W.

Fig. 4, is a side view of a four blade screw propeller, showing in section how water to be transmitted to the outside of the propeller may pass through a pipe T, placed in the deadwood, or outside the stern of the vessel. Fig. 4, also exhibits how water may be passed through a fish-tail screw, for supposing the pipe T, stuffing boxes, and case *q q q q*, to be removed, and the openings OP, OP, not to be made, then we have a hollow shaft E E admitting the water W, W, to the rear of the blades, through the opening R. *x, x, x,* are made to receive the universal joint that connects the propeller to a revoling shaft. With this arrangement of screw, the water required to fill up the void behind the blades, is taken up by the motion of the vessel, from the surrounding water, immediately before the propeller. The method just described, for conducting the water through a screw propeller, operated on a universal joint, may, with good effect, be applied to propellers secured to solid shafts.

Fig. 5, is an end elevation of Fig. 4; S, S, S, S, exhibit one of the many symmetrical methods, that may be employed, to place the apertures, to allow the water to escape, and effect the desired result herein described.

As the propeller moves in the direction indicated by the arrow, Fig. 5, the advanced half of the blade Y Z, cuts into the water undisturbed by the motion of the screw, and as the water passes S, S, the aft part of the blade ceases to be as efficient as the fore part Y Z, on account of the thickness of the metal of which the propeller is formed; a supply of water through S, S, Fig. 5; or through B, B, Fig. 1, renders the aft part of the blade as effective in propelling the vessel, as the fore part.

When water is conducted aft the propeller by the methods herein described, or by their equivalents, the slip of the screw is greatly diminished by its action thereon.

What we claim as our invention and desire to secure by Letters Patent, is—

The device and method herein described, or their equivalents, for conducting useless, or superfluous water to the rear of a screw propeller, in immediate contact with the blades aft, not for the purpose of giving a rotary motion to the propeller, but for the purpose of diminishing what is termed slip, by the operation and methods herein described, or by their equivalents.

OLIVER BYRNE.
J. G. ELLIOTT.

Witnesses:
JOHN O'GRADY, Jr.,
JOHN SUTHERLAND.